United States Patent [19]

Geffon et al.

[11] 4,202,017
[45] May 6, 1980

[54] MAGNETIC RECORDING SIGNAL EQUALIZATION APPARATUS

[75] Inventors: Arthur P. Geffon, Sunnyvale; George V. Jacoby, Los Altos, both of Calif.

[73] Assignee: Sperry Rand Corporation, New York, N.Y.

[21] Appl. No.: 903,415

[22] Filed: May 8, 1978

[51] Int. Cl.$^2$ .......................... G11B 5/09; G11B 5/47
[52] U.S. Cl. ......................................... 360/45; 360/66
[58] Field of Search .................................. 360/45, 66

[56] References Cited

U.S. PATENT DOCUMENTS

| | | | |
|---|---|---|---|
| 3,262,124 | 7/1966 | Johnson et al. | 360/66 |
| 3,503,059 | 3/1970 | Ambrico | 360/45 |
| 3,792,443 | 2/1974 | Breikss | 360/51 |
| 3,967,317 | 6/1976 | Newell | 360/66 |

*Primary Examiner*—Vincent P. Canney
*Attorney, Agent, or Firm*—Eugene T. Battjer; William E. Cleaver; Marshall M. Truex

[57] ABSTRACT

Magnetic recording apparatus including signal equalization means for recording data so as to obtain read pulses therefrom which are symmetrical about their peak and substantially narrowed at both the base and half amplitude points whereby increased packing density may be achieved without attendant peak shift, the equalization being provided by means for generating an ac bias signal in conjunction with data transitions and associated equalizer transitions referenced to the bias signal for application to magnetic recording means.

11 Claims, 11 Drawing Figures

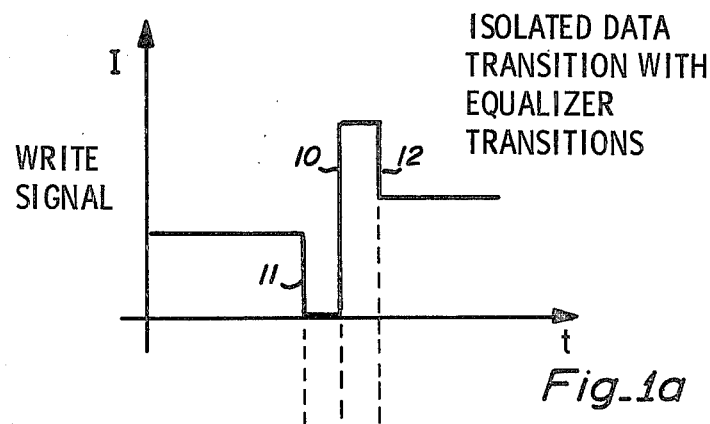
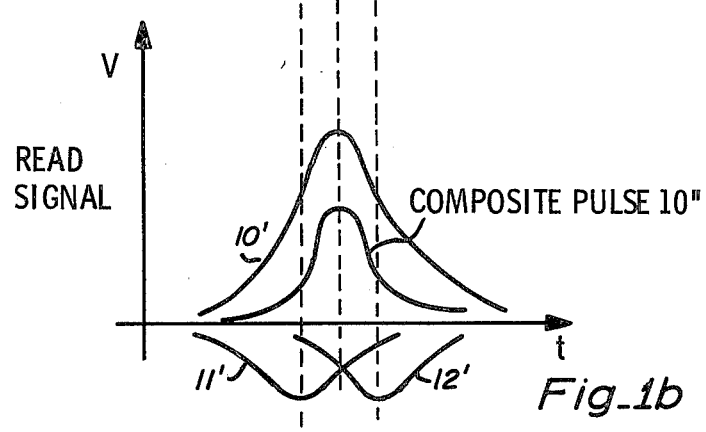
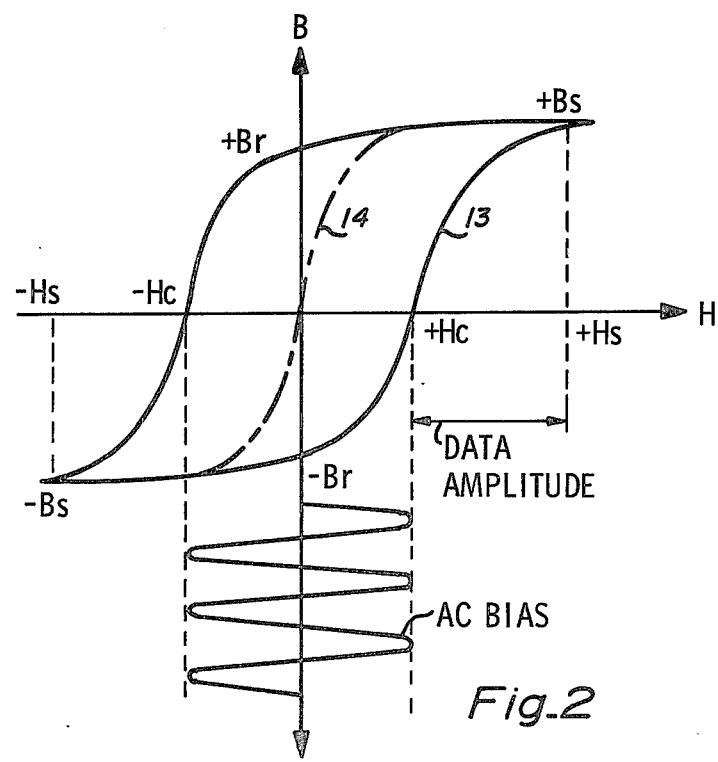

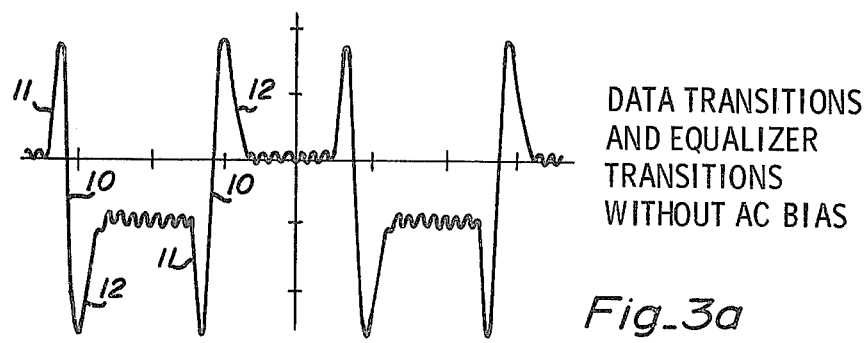
DATA TRANSITIONS AND EQUALIZER TRANSITIONS WITHOUT AC BIAS
Fig_3a
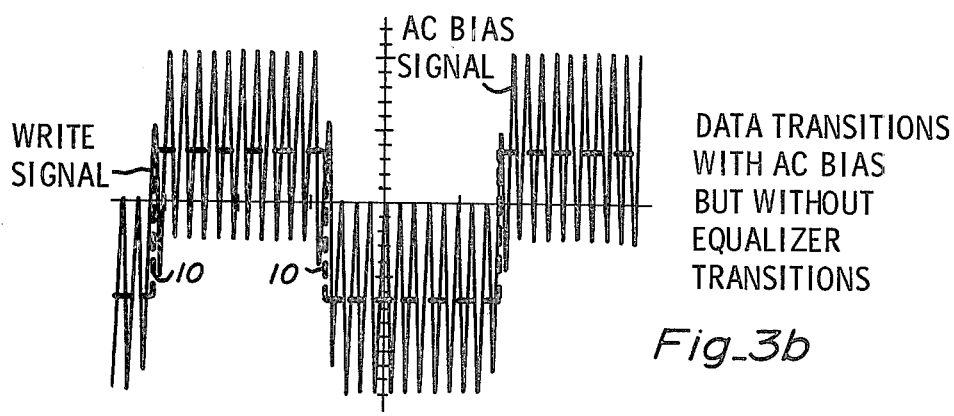
DATA TRANSITIONS WITH AC BIAS BUT WITHOUT EQUALIZER TRANSITIONS
Fig_3b
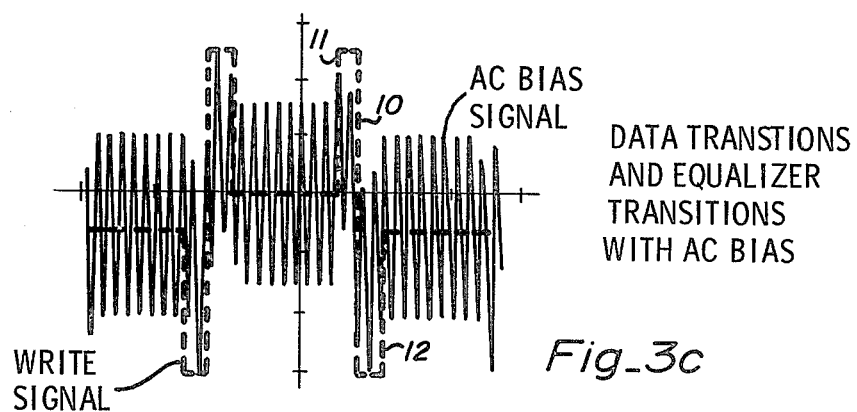
DATA TRANSTIONS AND EQUALIZER TRANSITIONS WITH AC BIAS
Fig_3c
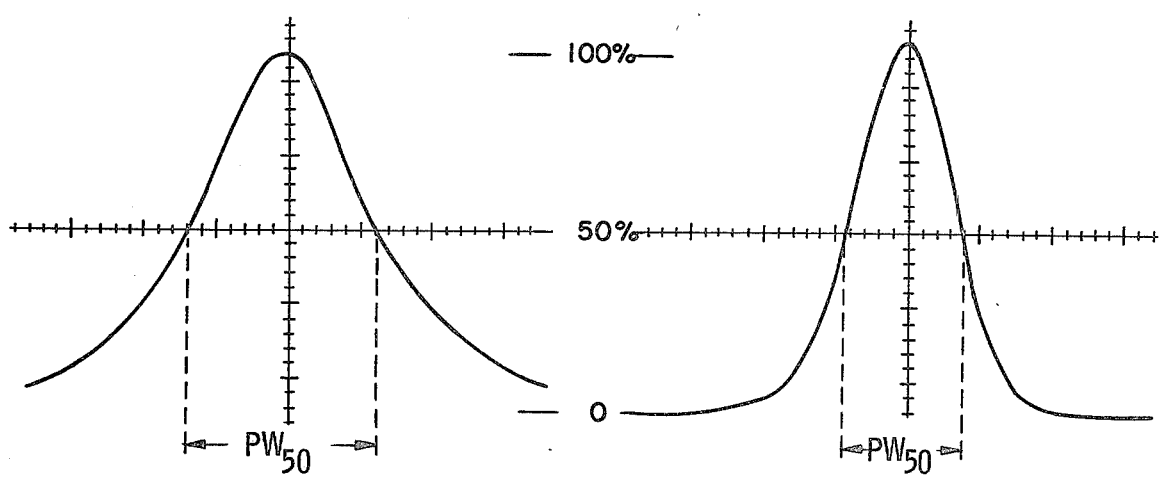
Fig_4a  READ PULSE
Fig_4b  READ PULSE

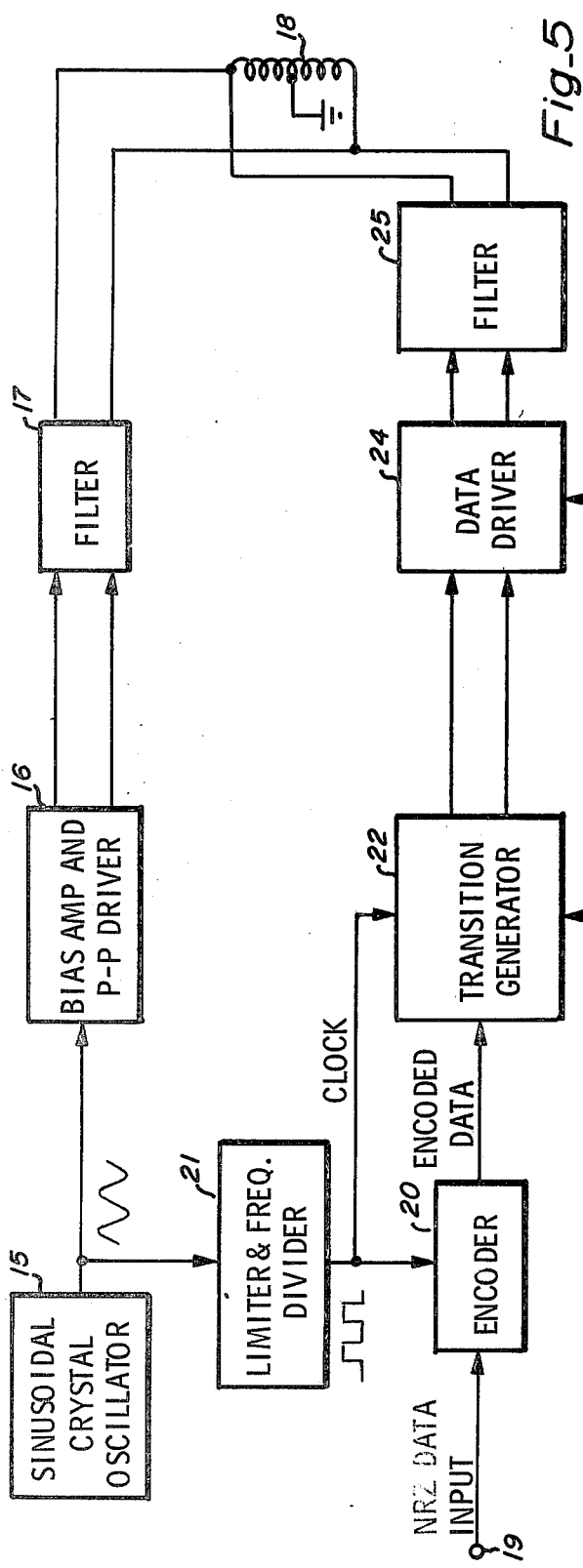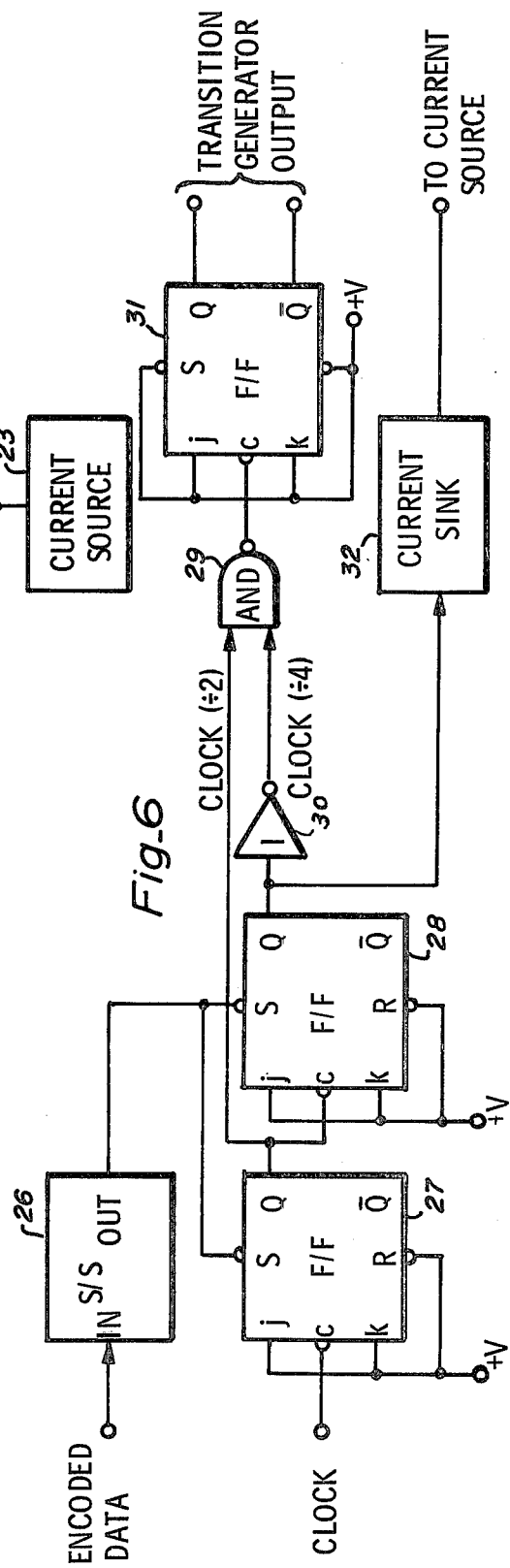

MAGNETIC RECORDING SIGNAL EQUALIZATION APPARATUS

BACKGROUND OF THE INVENTION

1. Field of Invention

This invention relates to magnetic data recording apparatus and more particularly to improvements in such apparatus for increasing data packing density and enhancing signal to noise ratio.

2. Description of Prior Art

Electronic data processing systems make use of magnetic recording media such as disk storage devices for mass storage of data. In such devices the data is typically recorded along a plurality of parallel tracks in the form of a sequence of alternate oppositely poled magnetic flux patterns where the successive flux transitions from one polarity to the other are representative of the recorded data. To increase the storage capacity the data packing density is generally made as great as possible along each track but, as has been known for quite some time, there is a practical limit to the packing density because of pulse crowding effects. Pulse crowding is manifested in the course of reading the recorded data by the occurrence of interference between adjacent read pulses corresponding to flux transitions which are too closely spaced on the recording medium. The interpulse interference caused by pulse crowding has the deleterious effect of shifting the peaks of the read pulses, so called peak shift, and distorting the read pulse amplitude with resultant degradation of data retrieval as is well known and understood by those skilled in the art.

Various data encoding techniques have been developed heretofore for reducing the number of flux transitions per data bit in order to alleviate pulse crowding and the attendant peak shift and amplitude distortion. Also, various write compensation and read and write signal equalization techniques have been developed for use either alone or in combination with the encoding techniques for further mitigating the pulse crowding. Write equalization, for example, to which the present invention relates, provides for recording the data in such a way that the individual read pulses are narrowed and/or made more symmetrical to some degree so as to decrease interpulse interference and thereby reduce peak shift and amplitude distortion. U.S. Pat. No. 3,503,059 Pulse Crowding Compensation for Magnetic Recording, issued Mar. 24, 1970 in the name of L. E. Ambrico and U.S. Pat. application Ser. No. 893,103 An Improved Magnetic Recording Apparatus and Method, filed Apr. 3, 1978 in the name of D. T. Best are illustrative of prior art write equalization techniques related to the present invention. The Ambrico patent describes apparatus which provides for recording a minor (equalizer) flux transition opposite in polarity to and following each major (data) transition. In the absence of the minor transition, a read pulse produced from the recorded major transition tends to be asymmetrical with a trailing portion considerably longer than its leading portion as a consequence of inherent characteristics of the magnetic recording and reading process. The minor transition acts to reduce the length of the trailing portion of the read pulse. More specifically, each minor transition has an amplitude and spacing relative to its associated major transition so as to produce a pulse which overlaps and is opposite in polarity to the trailing portion of the major transition read pulse and thus adds algebraically therewith to reduce the length of the trailing portion thereof whereby the data read pulse is narrowed somewhat and made more symmetrical. The Best patent application describes apparatus which utilizes a pair of minor transitions, one preceding and the other following each major transition, for still further narrowing and improving the symmetry of the read pulses, the amplitude of the minor transitions relative to one another being unequal and their spacing relative to the major transition being asymmetrical as required to obtain appropriate algebraic combination of all the related read pulses to produce a desired composite data read pulse. Nevertheless, the system is still not optimized.

In addition to the foregoing write equalization techniques, it is also known in the prior art, as exemplified by U.S. Pat. application Ser. No. 836,820, filed Sept. 26, 1977 in the name of G. V. Jacoby et al., and now abandoned, that improvement of read data pulse symmetry can be achieved in magnetic data storage systems by combining an ac bias signal with the data transitions during the recording process. This ac bias recording technique provides excellent pulse symmetry but only slight narrowing of the data read pulses.

SUMMARY OF THE INVENTION

It is a principal object of the present invention to provide improved magnetic data recording apparatus which affords the combination of the advantageous features of enhanced signal to noise ratio and read pulses of excellent symmetry and substantially narrowed width whereby significantly greater data packing density can be achieved. These features are obtained in accordance with the present invention by the provision of means for generating both the data transitions of an encoded data signal and associated equalizer transitions preceding and following each data transition in timed relation with the peak to peak changes of an ac bias signal which is linearly summed with the data and equalizer transitions for application to a magnetic transducer disposed in recording relation with a magnetic recording medium. The amplitudes of the ac bias signals and the data transitions are preferably set, as explained in the aforementioned Jacoby et al. patent application, such that the resultant summation current establishes a magnetizing force in the magnetic transducer sufficient to produce saturation or at least close to saturation flux patterns in the storage media in either of two opposed orientations depending on the direction of the magnetic flux established in the transducer in response to the current applied thereto. More specifically, the amplitude of the ac bias signal is set to provide a magnetizing force in the storage media approximately equal to the coercivity of the media, and the amplitude of the data transition is set to be approximately equal to that of the bias signal so that the sum of the two signals produces essentially saturation recording. A bias signal of this magnitude effectively renders the storage medium anhysteretic, that is, devoid of hysteresis, and provides phase linearity or symmetry of the read pulses as viewed in the time domain. Under such condition, although the data transition amplitude is only about half of that used in conventional saturation recording without ac bias, the read signal amplitude produced on readout is diminished by only about five or ten percent. The equalizer transitions are disposed symmetrically about the data transitions, one equalizer transition on each side of a data transition, and have an amplitude equal to about seventy five percent of half the data transition amplitude. Consequently, the magnetization signal applied to the recording transducer is substantially reduced in the interval between an equalizer transition following one data transition and the equalizer transition preceding the next subsequent data transition, whereby magnetization noise is substantially reduced in such interval. The equalizer transitions, however, in coacting with the associated data transitions to produce composite narrowed read pulses also diminish the read pulse amplitude somewhat, but the overall reduction in noise is even greater. Thus, signal to noise ratio is enhanced relative to prior art systems along with a substantial reduction in pulse width facilitating increased packing density without undue peak shift. Other features of the invention will become apparent from a reading of the ensuing detailed description given with reference to accompanying drawings.

BRIEF DESCRIPTION OF THE DRAWINGS

FIG. 1a is an illustration of a write signal comprising an isolated write data transition and associated write equalizer transitions.

FIG. 1b depicts read signal waveforms relating to the write transitions of FIG. 1a.

FIG. 2 is an illustration of the conventional hysteresis loop characteristic of a remanent magnetization material which is useful for explaining the operation of the ac bias in the invention.

FIGS. 3a, 3b and 3c are reproductions of oscilloscope traces showing write waveforms (a) with equalizer transitions but without ac bias, (b) with ac bias but without equalizer transitions, and (c) with ac bias and equalizer transitions.

FIGS. 4a and 4b depict read waveforms produced respectively from data recorded with only ac bias and with both ac bias and equalizer transitions.

FIG. 5 is a block diagram illustrative of apparatus embodying the principles of the present invention.

FIG. 6 is a block diagram of the transition generator incorporated in the apparatus illustrated in FIG. 5.

DESCRIPTION OF THE PREFERRED EMBODIMENT

Figure 7:
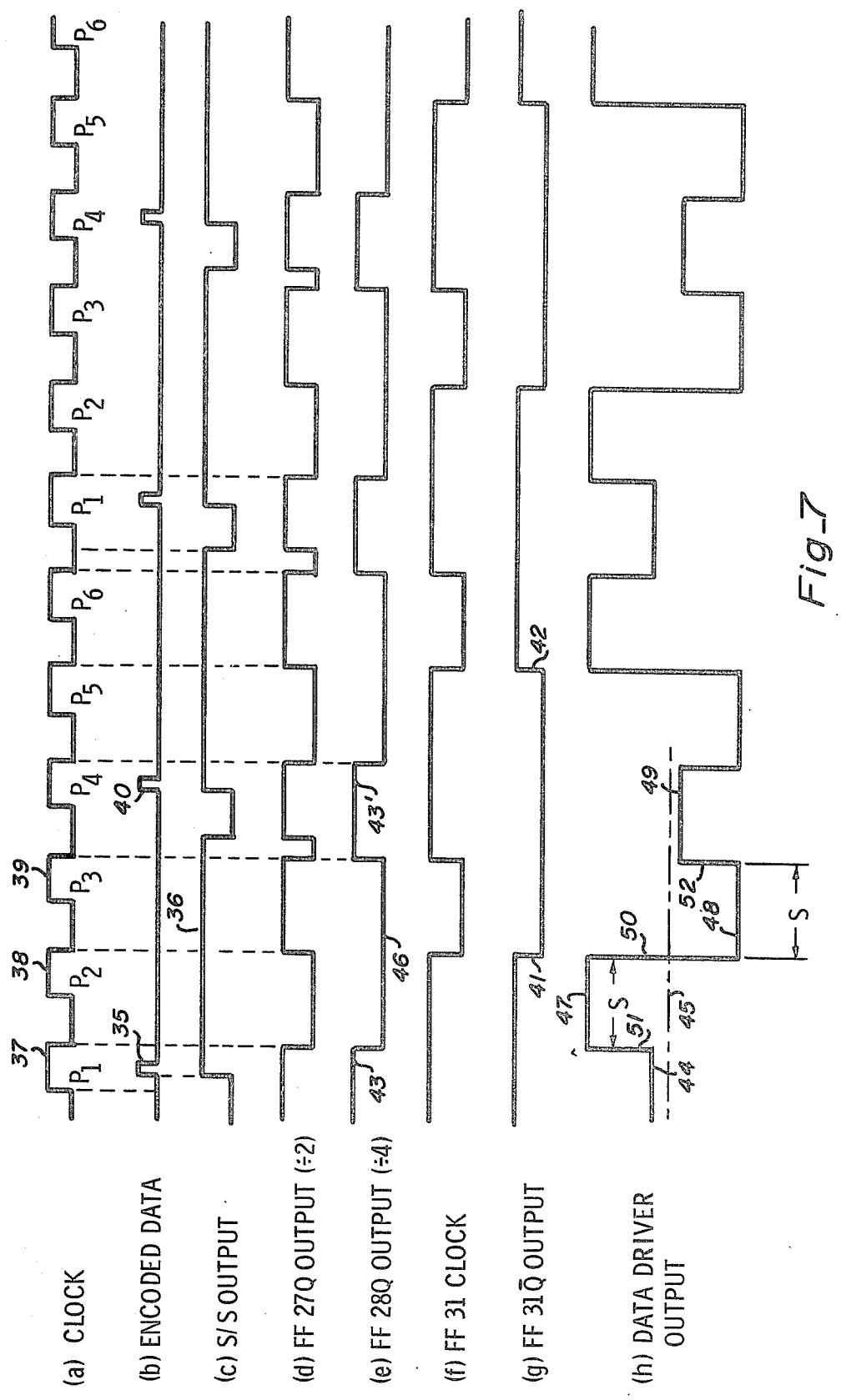
FIG. 7a–h depict waveforms useful for explaining the operation of the transition generator shown in FIG. 5.

Before proceeding with a detailed description of a presently preferred embodiment for carrying out the principles of the invention reference will first be made to FIGS. 1a through 4b to provide further explanation of the manner in which the aforestated advantageous features of the invention are achieved. FIG. 1a depicts an isolated write data transition 10 and associated equalizer transitions 11 and 12 respectively preceding and following the data transition. These transitions are representative of changes in the direction of current applied to a magnetic recording head and thus also representative of changes in the flux orientation recorded on a magnetizable medium disposed in recording relation with the head. Read pulses which theoretically would be reproduced from the recorded transitions are shown in FIG. 1b wherein positive polarity read pulse 10' corresponds to positive going data transition 10 and negative polarity read pulses 11' and 12' correspond respectively to negative going equalizer transitions 11 and 12. These read pulses are indicated as being symmetrical about the peak, a condition which would be obtained with recording apparatus constructed in accordance with the teaching of the previously mentioned Jacoby et al. application. In the absence of ac bias, however, the read pulses 10', 11' and 12' would actually have a substantially longer trailing portion following the pulse peaks. In any event, it is seen that data read pulse 10' corresponding to data transition 10 is quite broad and it will be appreciated that such a broad read data pulse will limit the data recording density because individual read data pulses will overlap and interfere with one another with resultant shifting of the peaks of the read pulses (peak shift) as is well understood by those skilled in the art. Since the data is represented by the position or time location of the transitions, such peak shift must be avoided or at least limited to assure accurate recovery of high density recorded data. This is accomplished by the equalizer transitions as explained in the aforementioned Ambrico patent and Best patent application by virtue of read pulses 11' and 12' adding algebraically with read pulse 10' so that a magnetic read head disposed proximate the magnetizeable medium actually produces a single composite read pulse 10" which is substantially narrower than read pulse 10', although also undesirably diminished in amplitude. The equalizer transitions must therefore be appropriately spaced from the data transition to avoid inordinate diminution of the composite pulse amplitude as would occur in the case where the equalizer transitions are too closely spaced to the data transition and likewise must be positioned so as to preclude occurrence of a secondary peak along either slope of the composite read pulse as would result in the case of equalizer transitions spaced too far from the data transition. The aforementioned Best patent application also explains the necessity for disposing the equalizer transitions asymmetrically about the data transition to obtain an appropriately shaped composite read pulse. In the case of the present invention, however, the equalizer transitions may be positioned symmetrically about the data transition as will become apparent from the remainder of the description. A reproduction of an oscilloscope trace depicting a write signal having both data and equalizer transitions is shown in FIG. 3a.

As previously mentioned, slimming of the read pulses to avoid interference therebetween is achieved in accordance with the present invention by means of a write equalization technique which provides for recording equalizer transistions about each data transition in the presence of an ac bias signal applied to the recording medium simultaneously with the data and equalizer transitions. It has been found that the combination of ac bias and equalizer transitions permits the equalizer transitions to be symmetrically disposed about the data transitions thereby avoiding complexities attendant to asymmetrical placement as employed in prior art apparatus. In addition, it has been discovered that with such combination of ac bias and symmetrically disposed equalizer transitions the equalizer transition amplitudes can be made equal to one another and larger than heretofore relative to the amplitude of the data transition. As a consequence, the magnetic head recording current and related magnetization of the recording medium is reduced in each interval between adjacent equalizer transitions disposed on opposite sides of successive data transitions with resultant diminution of background magnetization noise whereby signal to noise ratio is enhanced notwithstanding the reduction in the composite read pulse amplitude caused by the presence of the equalizer transitions.

The presently preferred manner of ac bias is that disclosed in the aforementioned Jacoby patent application and is described herein with reference to FIG. 2 which depicts the conventional hysteresis loop characteristic 13 of a remanent magnetization material where H represents magnetizing force and B represents the magnetic flux density. The ac bias signal has a peak amplitude to produce a magnetizing force in an associated magnetizable recording medium equal to the coercivity ($\pm$Hc) of the medium, and preferably in the range of 0.9 Hc to 1.2 Hc. This magnetizing force produced by the ac bias signal is typically about one half the magnetizing force ($\pm$Hs) required to establish magnetic saturation in the recording medium. The write data transitions likewise have an amplitude to produce a magnetizing force in the recording medium approximately equal to the coercivity of the medium. Linear summation of the data transitions with the ac bias has the effect of raising the magnetizing force in the recording medium to $\pm$Hs depending on the direction of data current flow through the recording head and thereby driving the recording medium into or close to magnetic saturation, preferably to at least ninety percent of Hs. In other words, when the write data transition produces current flow in one direction or the other in the recording head it has the effect essentially of causing the bias to vary about the plus or minus Hc point depending on the direction of data current flow. This is illustrated by the waveforms of FIG. 3b for the case of ac bias with write data transitions 10, but no equalizer transitions. The waveforms of FIG. 3c illustrate the situation for ac bias applied in combination with both write data transitions 10 and equalizer transitions 11 and 12. Alternatively, for the purpose of explaining the theory of operation, the ac bias signal having a peak amplitude of $\pm$Hc may be regarded as rendering the magnetic media anhysteretic, that is devoid of hysteresis, so that the magnetization does not follow the hysteresis loop characteristic in response to applied magnetizing force but instead follows the dot-dash curve 14. It is seen that this curve passes through the intersection of the B-H axes and reaches the $\pm$Bs levels respectively at approximately $\pm$Hc. Thus, when an ac bias signal is present which produces in the recording medium a magnetization equal to the coercivity Hc, an applied data transition, which likewise produces in the recording medium a magnetizing force approximately equal to the coercivity, will be effective to change the magnetization from zero to $\pm$Bs. The amplitude of the magnetization change is therefore essentially the same as in the case of saturation recording so that read signal amplitude is preserved. In any case, the bias signal frequency is customarily selected to be at least three times the highest data signal frequency to minimize distortion, and both the data transitions and equalizer transitions should be timed to occur in coincidence with peak to peak changes of the ac bias signal although this may not be necessary if the bias frequency is at least an order of magnitude greater than the highest data frequency in which case a suitable time relationship will exist notwithstanding insignificant time differences between the bias and write signal changes.

FIG. 4a is a reproduction of an oscilloscope tracing of a read pulse obtained with ac bias recording without equalizer transitions wherein the data transitions orient the magnetization of the recording medium in one direction or the other in accordance with the sense of the transitions. FIG. 4b is a reproduction of an oscilloscope tracing of a read pulse obtained from a recording made in accordance with the principles of the instant invention by appropriately combining ac bias and equalizer transitions with the data transitions. It is seen that the pulse width at the half amplitude level ($PW_{50}$) is substantially reduced.

The operation of a preferred embodiment of the invention will now be described with reference to FIGS. 5, 6 and 7. Referring first to FIG. 5, crystal oscillator 15 generates a single frequency, low distortion, sinusoidal signal which supplies an ac bias signal through bias amplifier and push-pull driver 16 and filter 17 across magnetic recording head 18 which has its center tap connected to ground or other suitable reference potential. Bias amplifier and push-pull driver 16 operates in conventional manner to supply current to recording head 18 and inhibit generation of even harmonic so as to reduce distortion in the bias signal. Filter 17 functions to isolate the bias amplifier and push-pull driver from the data and equalizer transitions supplied to recording head from the other elements of FIG. 5 as will now be explained. Data to be recorded is supplied at terminal 19 in an NRZ format, which is at a high signal level for "one" data bits and at a low signal level for "zero" data bits, for application to encoder 20. The encoder may function, for example, to encode the input data in 3PM code which is described in U.S. patent application Ser. No. 705,199, filed July 14, 1976 in the name of G. V. Jacoby as sole inventor. Such encoding, as explained with reference to the preferred embodiment of said Jacoby application Ser. No. 705,199, is performed by operating on successive data words each of which is encoded as one or two data transitions located at any of six transition positions in a data cell, but with a minimum of three positions between adjacent encoded transitions. This will be explained further a little later with reference to FIG. 7. The encoded data transitions are generated in time coincidence with peak to peak transitions of the ac bias signal by applying the sinusoidal crystal oscillator output signal through limiter and frequency divide 21 as a clock input to encoder 20. For 3PM encoded data the clock frequency must be at least three times the maximum data frequency. Also, as previously mentioned the ac bias signal frequency should be at least three times the maximum data frequency. Therefore, if the sinusoidal crystal oscillator generates a signal frequency which is exactly three times the maximum data frequency, it will not be necessary to provide frequency division to obtain the clock signal for encoder 20. In any event, the encoded data provided at the output of encoder 20 is applied to transition generator 22 which responds to the encoded signal and cooperates with current source 23 and differential data driver 24 to generate the data and equalizer transitions. More specifically, transition generator 22, current source 23 and data driver 24 coact in such a way as to produce high current flow to recording head 18 during the intervals between equalizer transitions preceding and following a data transition and substantially reduce the recording current outside such intervals. This is accomplished by virtue of current source 23 acting to supply a high level current to data driver 24 during the intervals between equalizer transitions preceding and following a data transition while outside such intervals the current is substantially drained into a current sink in transition generator 22 as will be explained momentarily in further detail with reference to FIGS. 6 and 7. The equalized write signal provided at the output of data driver 24 is applied through filter 25 to recording head 18 where it combines with the ac bias signal to provide high density recording as hereinbefore described with reference to FIGS. 1 through 4. Filter 25 functions to isolate the data driver from the ac bias signal.

Referring to FIG. 6, the encoded data out of encoder 20 is applied to the input terminal of single-shot 26 in transition generator 22 and the clock signal from limiter and frequency divider 21 is applied to the clock (c) input of flip flop 27 in the transition generator. It will be recalled from the preceding description that the encoded data pulses were stated to be produced in time coincidence with peak to peak changes of the ac bias signal, that is, in coincidence with the clock pulses out of limiter and frequency divider 21. Accordingly, appropriate delay (not shown) is introduced in either the clock signal or the encoded data to establish a timing relationship therebetween for application to the transition generator as indicated in waveforms (a) and (b) of FIG. 7. Further, it will be noted that positive clock pulses occur repetitively at positions $P_1$ through $P_6$ and that the encoded data pulses occur at every third clock pulse. This represents the maximum data frequency but it should be understood that the encoded data pulses can occur at other positions and can be spaced more than three positions. At the occurrence of the first encoded data pulse 35 the output of single shot 26, waveform (c) of FIG. 7, goes to a high level 36 and remains high until about midway between the following positions $P_3$ and $P_4$. At the occurrence of the negative going edge of the first clock pulse 37, the Q output of flip flop 27, waveform (d) of FIG. 7, switches to a low-level and then successively high and low at the occurrence of the negative going edges of clock pulses 38 and 39 respectively. During the same time period the Q output of flip flop 28, waveform (e) of FIG. 7, which has its clock input coupled to the Q output of flip flop 27, switches to a low level and then back to a high level at the occurrence of the negative going edges of clock pulses 37 and 39 respectively. Thereafter, when single shot 26 times out and its output switches to a low level about midway between positions $P_3$ and $P_4$ flip flops 27 and 28 are set by virtue of the single shot output being coupled to the set (S) input of the flip flops. Setting of the flip flops causes flip flop 27 to switch to a high level while flip flop 28 remains at the high level to which it was driven on the occurrence of the negative going edge of clock pulse 39. When the next encoded data pulse 40 is applied to the clock input of flip flop 27 the foregoing action is repeated. As a result of such action and the coupling of the Q output of flip flop 27 to AND gate 29 and the further coupling of the Q output of flip flop 28 to AND gate 29 by way of inverter 30, the clock input of flip flop 31 receives a clock signal illustrated by waveform (f) of FIG. 7. Flip flop 31 responds to this clock signal by switching on each negative going edge thereof to produce a signal at its $\overline{Q}$ output as shown in waveform (g) of FIG. 7 where transitions 41 and 42 correspond to encoded data pulses 35 and 40 respectively and are thus representative of data transitions.

The Q and $\overline{Q}$ outputs of flip flop 31 are coupled to data driver 24 (FIG. 5) and the Q output of flip flop 28 is coupled to current sink 32 which in turn is coupled to current source 23 (FIG. 5). When the Q output of flip flop 28 is at a high level 43, the data driver output current, waveform (h) of FIG. 7, is at a low level 44 above quiescent level 45 because at this time the current sink is on and operates to divert current from current source 23 away from data driver 24. As the Q output of flip flop 28 switches to a low level 46 it turns off current sink 32 enabling current source 23 to supply high level current to data driver 24, whereby the data driver output current increases to a high level 47 until it switches at the occurrence of data transition 41 to high level current 48 flowing in the opposite direction through recording head 18. Then when the Q output of flip flop 28 switches back to a high level 43' current sink 32 turns on again and diverts current away from data driver 24 causing the data driver output current to switch to a low level 49 slightly below quiescent level 45. The change 50 in the data driver output current thus constitutes a data transition corresponding to encoded data pulse 35 while the changes 51 and 52 constitute equalizer transitions respectively preceding and following the data transition and having a sense opposite thereto. Although the equalizer transitions are depicted in waveform (h) of FIG. 7 as being spaced from each other by the same amount as they are spaced from their associated data transition, it will be appreciated that the spacing from an equalizer transition following one data transition to the equalizer transition preceding the next data transition will increase as the data frequency decreases, that is as the encoded data pulses become spaced further apart.

Thus, it is seen that the equalizer transitions are equal in amplitude and symmetrically disposed about the data transition, and further that the equalizer transitions have an amplitude equal to about three eighths of the peak to peak data transition amplitude. The amplitude of the equalizer transitions is not limited, however, to this particular value. It has been determined though, that the equalizer transition amplitude preferably should be in the range of 0.37 to 0.43 times the peak to peak data transition amplitude and the spacing (s) between each equalizer transition and its associated data transition preferably should be in the range of 0.21 to 0.39 times the $PW_{50}$ of the read pulse, obtained with ac bias alone before the equalizer transitions are applied.

While a preferred embodiment of the invention has been described in specific detail, it will be understood that various modifications and substitutions may be made therein without departing from the spirit and scope of the invention as defined in the appended claims.

We claim:

1. Magnetic data recording apparatus for supplying a recording signal including ac bias and write data occurring at a repetition frequency to a magnetic recording transducer to record data in the form of magnetic patterns in a magnetizable medium, comprising:

means for supplying an ac bias signal to the recording transducer, said ac signal occurring at a frequency greater than said repetition frequency, means for generating data transitions representative of the data to be recorded, and means operatively associated with the data transition generating means for producing an equalizer transition preceding each data transition an an equalizer transition following each data transition, the equalizer transitions having substantially equal magnitudes and being oppositely sensed to the associated data transition and having an amplitude greater than about 0.375 times the amplitude of the data transition, and said equalizer transitions being uniformly spaced from the data transition so as to combine therewith on readout from the magnetizable medium to provide a composite data read pulse of reduced width at the base and half amplitude levels and means for combinationally coupling said ac bias signal and said transitions to said magnetic recording transducer.

2. The apparatus of claim 1 wherein the amplitude of the equalizer transitions is in the range of 0.37 to 0.43 times the amplitude of the data transition.

3. The apparatus of claim 1 wherein the ac bias signal has a peak amplitude to generate a magnetizing flux signal capable of establishing a magnetic force in the magnetizable medium approximately equal to the coercivity thereof and the data transition amplitude is approximately equal to the ac bias signal peak amplitude.

4. The apparatus of claim 1 wherein the equalizer transitions are symmetrically disposed about the data transition and each spaced from the data transition an amount in the range of 0.21 to 0.39 times the half amplitude width of a read pulse produced from a data transition recorded with an ac bias signal but without equalizer transitions.

5. The apparatus of claim 4 wherein the ac bias signal has a peak amplitude to generate a magnetizing flux signal capable of establishing a magnetic force in the magnetizable medium approximately equal to the coercivity thereof and the data transition amplitude is approximately equal to the ac bias signal peak amplitude.

6. The apparatus of claim 1 wherein said combinationally coupling means includes means for deriving a clock signal from said ac bias signal and means coupling said clock signal to said data transition generating means and to said equalizer transition producing means for timing the data transitions and equalizer transitions to the ac bias signal.

7. The apparatus of claim 6 wherein the minimum data transition period and the data transition to equalizer transition spacing are an integral multiple of the clock signal period.

8. The apparatus of claim 7 wherein the amplitude of the equalizer transitions is in the range of 0.37 to 0.43 times the amplitude of the data transition.

9. The apparatus of claim 8 wherein the ac bias signal has a peak amplitude to generate a magnetizing flux signal capable of establishing a magnetic force in the magnetizable medium approximately equal to the coercivity thereof and the data transition amplitude is approximately equal to the ac bias signal peak amplitude.

10. The apparatus of claim 8 wherein the equalizer transitions are symmetrically disposed about the data transition and each spaced from the data transition an amount in the range of 0.21 to 0.39 times the half amplitude width of a read pulse produced from a data transition recorded with an ac bias signal but without equalizer transitions.

11. The apparatus of claim 10 wherein the ac bias signal has a peak amplitude to generate a magnetizing flux signal capable of establishing a magnetic force in the magnetizable medium approximately equal to the coercivity thereof and the data transition amplitude is approximately equal to the ac bias signal peak amplitude.

* * * * *